(12) United States Patent
Hosseini et al.

(10) Patent No.: US 11,272,464 B2
(45) Date of Patent: Mar. 8, 2022

(54) CAPABILITY SIGNALING AND HANDLING PHASE DISCONTINUITY

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/816,240

(22) Filed: Mar. 11, 2020

(65) Prior Publication Data

US 2020/0296677 A1    Sep. 17, 2020

Related U.S. Application Data

(60) Provisional application No. 62/817,552, filed on Mar. 12, 2019.

(51) Int. Cl.
*H04W 52/52* (2009.01)
*H04W 8/24* (2009.01)
(Continued)

(52) U.S. Cl.
CPC ............. *H04W 52/52* (2013.01); *H04L 5/12* (2013.01); *H04W 8/24* (2013.01); *H04W 72/0453* (2013.01); *H04W 76/15* (2018.02)

(58) Field of Classification Search
CPC ......... H04L 5/001; H04L 5/0035; H04L 5/12; H04W 8/22; H04W 8/24; H04W 52/52; H04W 72/0453; H04W 76/15
See application file for complete search history.

(56) References Cited

U.S. PATENT DOCUMENTS

2019/0081675 A1\* 3/2019 Jung ................... H04W 56/001
2020/0221399 A1\* 7/2020 Hosseini ............. H04W 52/346

OTHER PUBLICATIONS

CHTTL; "WF for new capability signalling for intra-band EN-DC and NR CA"; 3GPP TSG-RAN WG4 Meeting #88bis Chengdu, China, Oct. 8-12, 2018 R4-1814175 (Year: 2018).\*

(Continued)

*Primary Examiner* — Gary Mui
(74) *Attorney, Agent, or Firm* — Holland & Hart LLP/Qualcomm

(57) ABSTRACT

A user equipment (UE) may improve capability parameter signaling and handling phase discontinuity according to an absence or presence of certain capability parameters within a capability message. In one aspect, when a power amplifier capability parameter is present within a capability message, this may be treated as if a phase discontinuity capability parameter is absent from the capability message. Alternatively, in another aspect, when a power amplifier capability parameter is absent within a capability message, this may be handled as if a phase discontinuity capability parameter is present within a capability message. Thus, for band combinations that include intra-band carrier aggregation with a single band, UE may include a power amplifier capability parameter or a phase discontinuity capability parameter. For all other band combinations, the UE may refrain from including the power amplifier capability parameter and may include a phase discontinuity capability parameter in the capability message.

30 Claims, 8 Drawing Sheets

(51) Int. Cl.
*H04W 76/15* (2018.01)
*H04W 72/04* (2009.01)
*H04L 5/12* (2006.01)

(56) References Cited

OTHER PUBLICATIONS

He et al.; "LS on NR-LTE Co-existence";3GPP TSG RAN WG1 Meeting #94 Gothenburg, Sweden, Aug. 20-24, 2018 R1-1809992 (Year: 2018).*

3GPP TS 38.306 V15.4.0 (Dec. 2018) "Generation Partnership Project; Technical Specification Group Radio Access Network; NR; User Equipment (UE) radio access capabilities (Release 15)" (Year: 2018).*

3GPP TS 38.521-3 V15.1.0 (Dec. 2018) "3rd Generation Partnership Project; Technical Specification Group Radio Access Network; NR; User Equipment (UE) conformance specification; Radio transmission and reception; Part 3: Range 1 and Range 2 Interworking operation with other radios; (Release 15)" (Year: 2018).*

"3rd Generation Partnership Project; Technical Specification Group Radio Access Network; NR; Radio Resource Control (RRC) protocol specification (Release 15)", 3GPP Draft, 38331-F40, 3rd Generation Partnership Project (3GPP), Mobile Competence Centre, 650. Route Des Lucioles, F-06921 Sophia-Antipolis Cedex, France, Jan. 14, 2019 (Jan. 14, 2019), XP051687004, 472 Pages, Retrieved from the Internet: URL: http://www.3gpp.org/ftp/3guInternal/3GPP%5Fultimate%5Fversions%5Fto%5Fbe%5Ftransposed/sentToDpc/38331%2Df40%2Ezip, [retrieved on Jan. 14, 2019], Chapters 5.6. 6.3.3.

Intel Corporation: "Discussion on Capability Signaling of DualpA-Architecture and pa-PhaseDiscontinuityImpacts", 3GPP Draft, 3GPP TSG RAN WG1 Meeting #96, R1-1903739, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Mar. 3, 2019 (Mar. 3, 2019), XP051690986, 4 Pages, Retrieved from the Internet: URL: http://www.3gpp.org/ftp/tsg%5Fran/WG1%5FRL1/TSGR1%5F96/Docs/R1%2D1903739%2Ezip, [retrieved on Mar. 3, 2019], Chapters 1, 2.

Intel Corporation: "Intra-Band EN-DC Power Sharing", 3GPP Draft, 3GPP TSG-RAN WG4 88bis, R4-1813284 Intra-Band EN-DC Power Sharing-R02, 3rd Generation Partnership Project (3GPP), Mobile Competence Centre, 650, Route Des Lucioles, F-06921 Sophia-Antipolis Cedex, France, vol. Ran WG4. No. Chengdu, China, Oct. 8, 2018-Oct. 12, 2018, Sep. 28, 2018 (Sep. 28, 2018), XP051581959, 2 Pages, Retrieved from the Internet: URL: http://www.3gpp.org/ftp/tsg%5Fran/WG4%5FRadio/TSGR4%5F88Bis/Docs/R4%2D1813284%2Ezip, [retrieved on Sep. 28, 2018], Chapters 2, 3.

International Search Report and Written Opinion—PCT/US2020/022416—ISAEPO—dated May 19, 2020.

* cited by examiner

CAPABILITY SIGNALING AND HANDLING PHASE DISCONTINUITY

CROSS REFERENCE

The present Application for Patent claims the benefit of U.S. Provisional Patent Application No. 62/817,552 by HOSSEINI et al., entitled "CAPABILITY SIGNALING AND HANDLING PHASE DISCONTINUITY," filed Mar. 12, 2019, assigned to the assignee hereof, and expressly incorporated by reference in its entirety herein.

TECHNICAL FIELD

This disclosure relates to wireless communications, and more specifically to capability signaling for a single power amplifier versus a dual power amplifier, and handling phase discontinuity.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may configure UEs with one or more capability parameters. In some implementations, at least one capability parameter may be applicable for at least one band combination, while being inapplicable for other band combinations. As demand for efficient wireless communication increases, a wireless communications system may support methods for improving capability parameter signaling along with management of phase discontinuity.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication at a UE. The method may include identifying one or more of a band combination or a band in the band combination supported by a UE, determining whether the UE supports a dual power amplifier architecture for one or more of the band combination or the band in the band combination, and transmitting, to a base station, a message that includes an indication of whether the UE supports the dual power amplifier architecture for one or more of the band combination or the band in the band combination.

Another innovative aspect of the subject matter described in this disclosure can be implemented in an apparatus for wireless communication at the apparatus. The apparatus may include a processor, memory in electronic communication with the processor, and instructions stored in the memory. The instructions may be executable by the processor to cause the apparatus to identify one or more of a band combination or a band in the band combination supported by the apparatus, determine whether the apparatus supports a dual power amplifier architecture for one or more of the band combination or the band in the band combination, and transmit, to a base station, a message that includes an indication of whether the apparatus supports the dual power amplifier architecture for one or more of the band combination or the band in the band combination.

Another innovative aspect of the subject matter described in this disclosure can be implemented in an apparatus for wireless communication at the apparatus. The apparatus may include means for identifying one or more of a band combination or a band in the band combination supported by a UE, determining whether the apparatus supports a dual power amplifier architecture for one or more of the band combination or the band in the band combination, and transmitting, to a base station, a message that includes an indication of whether the apparatus supports the dual power amplifier architecture for one or more of the band combination or the band in the band combination.

Another innovative aspect of the subject matter described in this disclosure can be implemented in a non-transitory computer-readable medium storing code for wireless communication at a UE. The code may include instructions executable by a processor to identify a band combination supported by the UE, determine whether the UE supports a dual power amplifier architecture for the band combination, and transmit, to a base station, a message that includes an indication of whether the UE supports the dual power amplifier architecture for the band combination.

Some implementations of the method, apparatuses, and non-transitory computer-readable medium described herein may further include operations, features, means, or instructions for identifying that the band combination includes an intra-band carrier aggregation with a first band, where identifying the band combination may be based on identifying that the band combination includes the intra-band carrier aggregation with the first band, and selecting a power amplifier capability parameter or a phase discontinuity capability parameter to include in the message, where transmitting the message may be based on selecting the power amplifier capability parameter or the phase discontinuity capability parameter.

In some implementations of the method, apparatuses, and non-transitory computer-readable medium described herein, the power amplifier capability parameter or the phase discontinuity capability parameter may be configured to indicate whether the UE supports the dual power amplifier architecture for the band combination.

In some implementations of the method, apparatuses, and non-transitory computer-readable medium described herein, the message includes only one of the power amplifier capability parameter or the phase discontinuity capability parameter.

In some implementations of the method, apparatuses, and non-transitory computer-readable medium described herein, the power amplifier capability parameter includes a dualpA- Architecture parameter, and the phase discontinuity capability parameter includes a pa-PhaseDiscontinuityImpacts parameter.

Some implementations of the method, apparatuses, and non-transitory computer-readable medium described herein may further include operations, features, means, or instructions for identifying that the band combination includes an intra-band E-UTRAN New Radio-Dual Connectivity (EN-DC) with a first band and an intra-band carrier aggregation with a second band, where identifying the band combination may be based on identifying that the band combination includes the EN-DC with the first band and the intra-band carrier aggregation with the second band, and selecting a phase discontinuity capability parameter to include in the message, where transmitting the message may be based on selecting the phase discontinuity capability parameter.

Some implementations of the method, apparatuses, and non-transitory computer-readable medium described herein may further include operations, features, means, or instructions for determining that the message does not support including a power amplifier capability parameter for the band combination, and generating a phase discontinuity capability parameter to indicate that the UE supports the dual power amplifier architecture for the band combination, where the message includes the phase discontinuity capability parameter.

Some implementations of the method, apparatuses, and non-transitory computer-readable medium described herein may further include operations, features, means, or instructions for identifying whether the UE supports a phase discontinuity for the band combination, where transmitting the message may be based on identifying whether the UE supports the phase discontinuity.

In some implementations of the method, apparatuses, and non-transitory computer-readable medium described herein, the band combination includes an EN-DC, NE-DC, NR-NR DC, NR-CA, or any combination thereof.

In some implementations of the method, apparatuses, and non-transitory computer-readable medium described herein, the message includes a capability message configured to indicate capabilities of the UE to the base station.

One innovative aspect of the subject matter described in this disclosure can be implemented in a method at a base station. The method may include receiving, from a UE, a message that indicates one or more capabilities of the UE, identifying one or more band combinations or one or more bands in the one or more band combinations supported by the UE based on receiving the message, and determining that the UE supports a dual power amplifier architecture for each of the one or more band combinations or the one or more bands in the one or more band combinations.

Another innovative aspect of the subject matter described in this disclosure can be implemented in an apparatus for wireless communication at the apparatus. The apparatus may include a processor, memory in electronic communication with the processor, and instructions stored in the memory. The instructions may be executable by the processor to cause the apparatus to receive, from a UE, a message that indicates one or more capabilities of the UE, identify one or more band combinations or one or more bands in the one or more band combinations supported by the UE based on receiving the message, and determine that the UE supports a dual power amplifier architecture for each of the one or more band combinations or the one or more bands in the one or more band combinations.

Another innovative aspect of the subject matter described in this disclosure can be implemented in an apparatus for wireless communication at the apparatus. The apparatus may include means for receiving, from a UE, a message that indicates one or more capabilities of the UE, identifying one or more band combinations or one or more bands in the one or more band combinations supported by the UE based on receiving the message, and determining that the UE supports a dual power amplifier architecture for each of the one or more band combinations or the one or more bands in the one or more band combinations.

Another innovative aspect of the subject matter described in this disclosure can be implemented in a non-transitory computer-readable medium storing code for wireless communication at a base station. The code may include instructions executable by a processor to receive, from a UE, a message that indicates one or more capabilities of the UE, identify one or more band combinations or one or more bands in the one or more band combinations supported by the UE based on receiving the message, and determine that the UE supports a dual power amplifier architecture for each of the one or more band combinations or the one or more bands in the one or more band combinations.

Some implementations of the method, apparatuses, and non-transitory computer-readable medium described herein may further include operations, features, means, or instructions for identifying that a first band combination of the one or more band combinations includes an intra-band carrier aggregation with a first band, and determining whether the message includes a power amplifier capability parameter or a phase discontinuity capability parameter for the first band combination, where determining that the UE supports the dual power amplifier architecture for the first band combination may be based on determining whether the message includes the power amplifier capability parameter or the phase discontinuity capability parameter.

In some implementations of the method, apparatuses, and non-transitory computer-readable medium described herein, the power amplifier capability parameter or the phase discontinuity capability parameter may be configured to indicate whether the UE supports the dual power amplifier architecture for the first band combination.

In some implementations of the method, apparatuses, and non-transitory computer-readable medium described herein, the power amplifier capability parameter includes a dualpA-Architecture parameter, and the phase discontinuity capability parameter includes a pa-PhaseDiscontinuityImpacts parameter.

Some implementations of the method, apparatuses, and non-transitory computer-readable medium described herein may further include operations, features, means, or instructions for identifying that a first band combination of the one or more band combinations includes an intra-band EN-DC with a first band and an intra-band carrier aggregation with a second band, and determining whether the message includes a phase discontinuity capability parameter, where determining that the UE supports the dual power amplifier architecture for the first band combination may be based on determining whether the message includes the phase discontinuity capability parameter.

In some implementations of the method, apparatuses, and non-transitory computer-readable medium described herein, the phase discontinuity capability parameter associated with the first band combination may be configured to indicate whether the UE supports the dual power amplifier architecture for the first band combination.

Some implementations of the method, apparatuses, and non-transitory computer-readable medium described herein may further include operations, features, means, or instructions for determining that the message does not support including a power amplifier capability parameter for a first band combination of the one or more band combinations, and determining whether the message includes a phase discontinuity capability parameter, where determining that the UE supports the dual power amplifier architecture for the first band combination may be based on determining whether the message includes the phase discontinuity capability parameter.

Some implementations of the method, apparatuses, and non-transitory computer-readable medium described herein may further include operations, features, means, or instructions for identifying whether the UE supports a phase discontinuity for a first band combination of the one or more band combinations based on receiving the message.

In some implementations of the method, apparatuses, and non-transitory computer-readable medium described herein, the one or more band combinations include an EN-DC, NE-DC, NR-NR DC, NR-CA, or any combination thereof.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
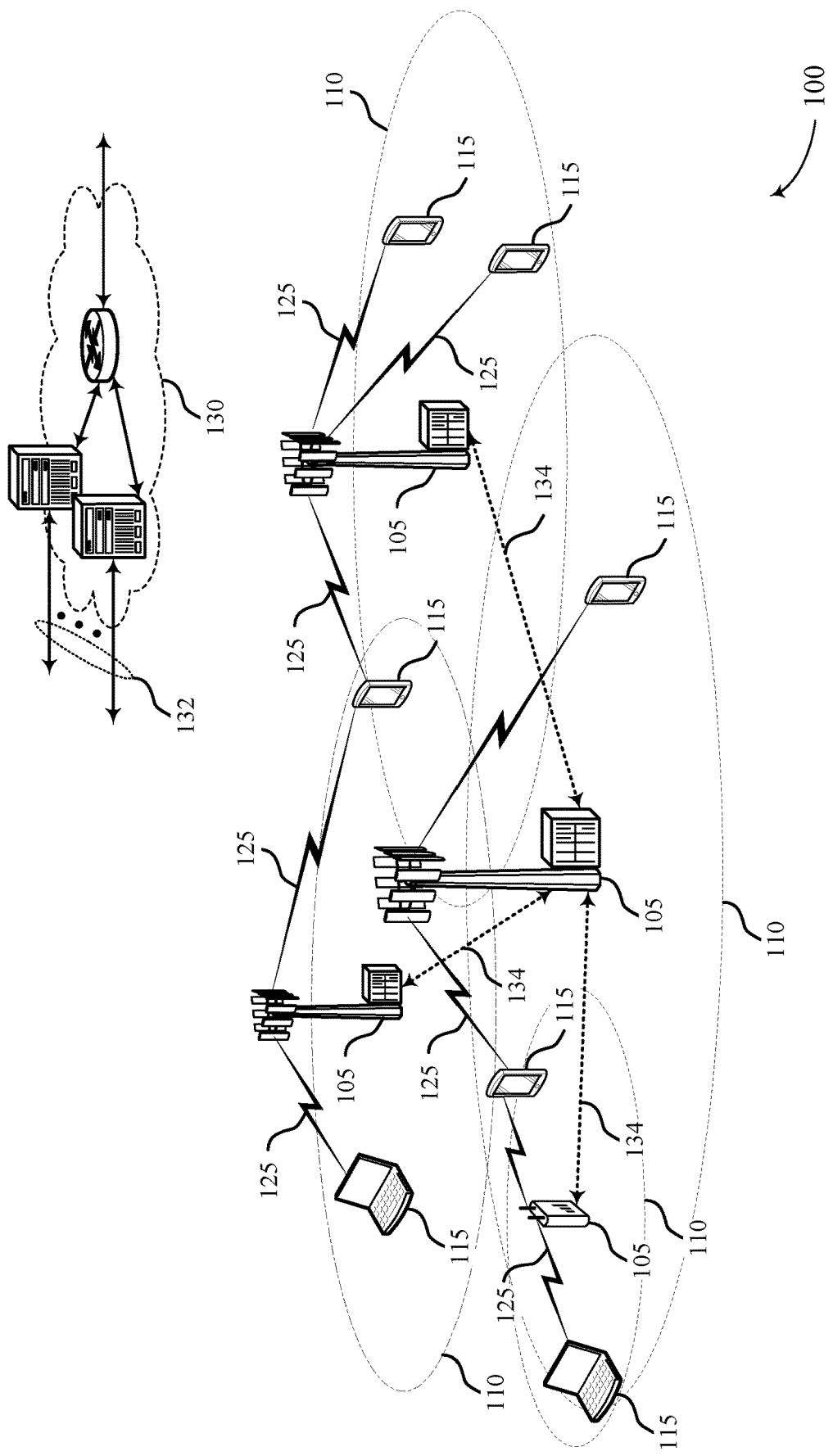
FIG. 1 illustrates an example of a wireless communications system that supports capability signaling and handling phase discontinuity.

The following description is directed to implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the 3GPP standards, or any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/ General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), New Radio (NR), AMPS, or other known signals that are used to communicate within a wireless, cellular or internet of things (IOT) network, such as a system utilizing 3G, 4G or 5G, or further implementations thereof, technology.

A base station (such as an eNodeB (eNB), a next-generation NodeB (either of which may be referred to as a gNB)) may configure a user equipment (UE) with one or more capability parameters, which the UE may use to signal a capability of the UE to the base station. In some implementations, at least one capability parameter may include a power amplifier capability parameter (also referred to herein as dualpA-Architecture). In some other implementations, at least one capability parameter may include a phase discontinuity capability parameter (also referred to herein as pa-PhaseDiscontinuityImpacts). In further implementations, at least one of the above example capability parameters may include a timing capability parameter (also referred to herein as ul-TimingAlignmentEUTRA-NR). Hence, the UE may be configurable to provide a capability indication that specifies whether the UE supports a single power amplifier or a dual power amplifier, as well as whether the UE supports handling phase discontinuity. Phase discontinuity may, in some implementations, occur due to simultaneous transmission of partially overlapping uplink channels.

The UE may signal at least one of the above example capability parameters via a message, such as a capability message. The capability message may, in some implementations, contain one or more fields. Each field may correspond to a certain capability parameter, such as, such as a power amplifier capability parameter, a phase discontinuity capability parameter, and the like. The UE may enable or disable a capability parameter by assigning a bit value to a field carrying a certain capability parameter. For example, a base station may configure a UE to signal a capability parameter via a bit indication in a field of a capability message. In some implementations, a UE may signal a capability parameter via a bit indication and according to different band combinations. In some other implementations, the absence or presence of the field in the capability message may be an indication of the capability of the UE.

The UE may signal the above example capability parameters according to different band combinations. In some implementations, at least one of the above example capability parameters may be signaled per band combination. For example, a power amplifier capability parameter may be signaled per band combination. Alternatively, a power amplifier capability parameter may be signaled per intra-band band combination. The power amplifier capability parameter may provide an indication that for band combinations with single band and with uplink carrier aggregation, the UE may support dual power amplifiers. If the power amplifier capability parameter happens to be absent in such a band combination, the absence may be an indication that the UE supports a single power amplifier for all uplink communications. For other band combinations, the power amplifier capability parameter may be inapplicable.

In further implementations, at least one of the above example capability parameters may be signaled per band-of-band combination. For example, a timing capability parameter may be signaled per band-of-band combination. The timing capability parameter may provide an indication of whether to apply a same uplink timing between NR and LTE for dynamic power sharing capable UE operating in intra-band contiguous synchronous EN-DC. If this field happened to be absent, the UE may be able to operate with a timing difference up to the applicable maximum transmission timing difference (MTTD) requirements when operating in a synchronous intra-band contiguous EUTRA-NR dual connectivity (EN-DC) network.

In other some implementations, at least one of the above example capability parameters may be signaled per band-of-band combination. For example, a phase discontinuity capability parameter may be signaled per band-of-band combination. The phase discontinuity capability parameter may provide an indication that the UE may be incapable of handling the impacts of power amplifier phase discontinuity with overlapping transmissions with non-aligned starting or ending times or hop boundaries across carriers for intra-band EN-DC, intra-band carrier aggregation and frequency-division multiplexing (FDM) based uplink sharing from the UE perspective (ULSUP).

In some implementations, because the capability signaling may be applicable to at least one band combination or a band in the at least one band combination, while being inapplicable for other band combinations or another band in the at least one band combination, there may be difficulties with the UE signaling its capability to the base station, such that the base station is aware of whether the UE supports a single power amplifier or dual power amplifier architecture. By way of example, in some implementations of intra-band EN-DC in a band with a single power amplifier and intra-band LTE/NR carrier aggregation in another band with dual power amplifiers (such as, intra-band plus inter-band DC/CA), a UE may be incapable of signaling its power amplifier capability parameter (such as, dualpA-Architecture). Therefore, the associated capability requirements, such as maximum power reduction and maximum sensitivity degradation values for dual power amplifiers architecture may be unsupported. Additionally, the UE may signal its phase discontinuity capability parameter (such as, pa-PhaseDiscontinuityImpacts), such as, incapable or capable depending on UE's power amplifier architecture. However, due to the capability signaling limits above, the base station may have certain requirements for a single power amplifier architecture for the UE.

Particular implementations of the subject matter described in this disclosure may be implemented to realize one or more of the following potential advantages. Specifically, to improve capability parameter signaling among different band combinations, a UE and a base station may operate appropriately according to an absence or presence of certain capability parameters within a capability message. According to an implementation, when a power amplifier capability parameter (such as, dualpA-Architecture) is present within a capability message (such as, bit signaled, enabled), the UE and the base station may treat this as if a phase discontinuity capability parameter (such as, pa-PhaseDiscontinuityImpacts) is absent from the capability message. Alternatively, according to another implementation, when a power amplifier capability parameter (such as, dualpA-Architecture) is absent within a capability message (such as, bit signaled, enabled), the UE and the base station may handle this as if a phase discontinuity capability parameter (such as, pa-PhaseDiscontinuityImpacts) is present within a capability message. Thus, for band combinations that include intra-band carrier aggregation with a single band, the UE may include a power amplifier capability parameter (such as, dualpA-Architecture) or a phase discontinuity capability parameter (such as, pa-PhaseDiscontinuityImpacts).

In some implementations, for band combinations that include intra-band carrier aggregation with more than one band, the UE may include a phase discontinuity capability parameter (such as, pa-PhaseDiscontinuityImpacts) for each band. The UE may include or omit a phase discontinuity capability parameter (such as, pa-PhaseDiscontinuityImpacts) for bands in which the UE supports aggregating multiple intra-band carriers in the given band combination that includes more than one band. The UE can thereby effectively indicate power amplifier architecture capabilities within each band, which may enable the base station to consider power capabilities of the UE when adjusting a power level associated with the UE via uplink power control and rate control. The UE may thus be enabled to signal its capabilities using configured signaling parameters, without having to configure new parameters.

In some implementations, the UE may be expected to include one and only one of the capability parameters. That is, the UE may be expected (such as, configured) to include one and only of the power amplifier capability parameter or the phase discontinuity capability parameter. For all other band combinations, the UE may refrain from including a power amplifier capability parameter (such as, dualpA-Architecture) in a capability message (such as, capability message), and may include a phase discontinuity capability parameter (such as, pa-PhaseDiscontinuityImpacts) in the capability message as needed. In some implementations, absence of a field associated with a capability parameter may be treated by the UE (and the base station) as an error case. For example, absence of both fields, such as a field of a power amplifier capability parameter and another field of a phase discontinuity capability parameter may be handled as an error case.

FIG. 1 illustrates an example of a wireless communications system 100 that supports capability signaling and handling phase discontinuity. The wireless communications system 100 includes base stations 105, UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (such as, mission critical) communications, low latency communications, or communications with low-cost and low-complexity devices.

Base stations 105 may wirelessly communicate with UEs 115 via one or more base station antennas. Base stations 105 described herein may include or may be referred to by those having ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (such as, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions also may be called forward link transmissions while uplink transmissions also may be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some implementations, a base station 105 may be movable and therefore provide communication coverage for a moving geographic coverage area 110. In some implementations, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as, over a carrier), and may be associated with an identifier for distinguishing neighboring cells (such as, a physical cell identifier (PCID), a virtual cell identifier (VCID)) operating via the same or a different carrier. In some implementations, a carrier may support multiple cells, and different cells may be configured according to different protocol types (such as, machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (such as, a sector) over which the logical entity operates.

UEs 115 may be dispersed throughout the wireless communications system 100, and each UE 115 may be stationary or mobile. A UE 115 also may be referred to as a mobile device, a wireless device, a remote device, a handheld device, or a subscriber device, or some other suitable terminology, where the "device" also may be referred to as a unit, a station, a terminal, or a client. A UE 115 also may be a personal electronic device such as a cellular phone, a personal digital assistant (PDA), a tablet computer, a laptop computer, or a personal computer. In some implementations, a UE 115 also may refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (such as, via Machine-to-Machine (M2M) communication). M2M communication or MTC may refer to data communication technologies that allow devices to communicate with one another or a base station 105 without human intervention. In some implementations, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as, a mode that supports one-way communication via transmission or reception, but not transmission and reception simultaneously). In some implementations half-duplex communications may be performed at a reduced peak rate. Other power conservation techniques for UEs 115 include entering a power saving "deep sleep" mode when not engaging in active communications, or operating over a limited bandwidth (such as, according to narrowband communications). In some implementations, UEs 115 may be designed to support critical functions (such as, mission critical functions), and a wireless communications system 100 may be configured to provide ultra-reliable communications for these functions.

In some implementations, a UE 115 also may be able to communicate directly with other UEs 115 (such as, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (such as, via an S1, N2, N3, or other interface). Base stations 105 may communicate with one another over backhaul links 134 (such as, via an X2, Xn, or other interface) either directly (such as, directly between base stations 105) or indirectly (such as, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as, radio heads and access network controllers) or consolidated into a single network device (such as, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as, less than 100 km) compared to transmission using the smaller frequencies and longer waves of the high frequency (HF) or very high frequency (VHF) portion of the spectrum below 300 MHz.

Wireless communications system 100 also may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 also may operate in an extremely high frequency (EHF) region of the spectrum (such as, from 30 GHz to 300 GHz), also known as the millimeter band. In some implementations, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (such as, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some implementations, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as, a base station 105) and a receiving device (such as, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which also may be referred to as spatial filtering, directional transmission, or directional reception, is a signal processing technique that may be used at a transmitting device or a receiving device (such as, a base station 105 or a UE 115) to shape or steer an antenna beam (such as, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (such as, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (such as synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as, by the base station 105 or a receiving device, such as a UE 115) a beam direction for subsequent transmission or reception by the base station 105.

Some signals, such as data signals associated with a particular receiving device, may be transmitted by a base station 105 in a single beam direction (such as, a direction associated with the receiving device, such as a UE 115). In some implementations, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as, for identifying a beam direction for subsequent transmission or reception by the UE 115), or transmitting a signal in a single direction (such as, for transmitting data to a receiving device).

A receiving device (such as, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at two or more antenna elements of an antenna array, or by processing received signals according to different receive beamforming weight sets applied to signals received at two or more antenna elements of an antenna array, any of which may be referred to as "listening" according to different receive beams or receive directions. In some implementations a receiving device may use a single receive beam to receive along a single beam direction (such as, when receiving a data signal). The single receive beam may be aligned in a beam direction determined based at least in part on listening according to different receive beam directions (such as, a beam direction determined to have a highest signal strength, highest signal-to-noise ratio, or otherwise acceptable signal quality based at least in part on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as, using a cyclic redundancy check (CRC)), forward error correction (FEC), and retransmission (such as, automatic repeat request (ARQ)). HARQ may improve throughput at the MAC layer in poor radio conditions (such as, signal-to-noise conditions). In some implementations, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as, depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (such as, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (such as, an evolved universal mobile telecommunication system terrestrial radio access (E-UTRA) absolute radio frequency channel number (EARFCN)), and may be positioned according to a channel raster for discovery by UEs 115. Carriers may be downlink or uplink (such as, in an FDD mode), or be configured to carry downlink and uplink communications (such as, in a TDD mode). In some implementations, signal waveforms transmitted over a carrier may be made up of multiple sub-carriers (such as, using multicarrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as, LTE, LTE-A, LTE-A Pro, NR). For example, communications over a carrier may be organized according to TTIs or slots, each of which may include user data as well as control information or signaling to support decoding the user data. A carrier also may include dedicated acquisition signaling (such as, synchronization signals or system information, etc.) and control signaling that coordinates operation for the carrier. In some implementations (such as, in a carrier aggregation configuration), a carrier also may have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some implementations, control information transmitted in a physical control channel may be distributed between different control regions in a cascaded manner (such as, between a common control region or common search space and one or more UE-specific control regions or UE-specific search spaces).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of bandwidths for carriers of a particular radio access technology (such as, 1.4, 3, 5, 10, 15, 20, 40, or 80 MHz). In some implementations, each served UE 115 may be configured for operating over portions or all of the carrier bandwidth. In some other examples, some UEs 115 may be configured for operation using a narrowband protocol type that is associated with a portion or range (such as, set of subcarriers or RB s) within a carrier (such as, "in-band" deployment of a narrowband protocol type).

In a system employing MCM techniques, a resource element may consist of one symbol period (such as, a duration of one modulation symbol) and one subcarrier, where the symbol period and subcarrier spacing are inversely related. The number of bits carried by each resource element may depend on the modulation scheme (such as, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as, spatial layers), and the use of multiple spatial layers may further increase the data rate for communications with a UE 115.

Devices of the wireless communications system 100 (such as, base stations 105 or UEs 115) may have a hardware configuration that supports communications over a particular carrier bandwidth, or may be configurable to support communications over one of a set of carrier bandwidths. In some implementations, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (such as, when multiple serving cells have a suboptimal or non-ideal backhaul link). An eCC also may be configured for use in unlicensed spectrum or shared spectrum (such as, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as, to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (such as, according to frequency channel or carrier bandwidths of 20, 40, 60, 80 MHz, etc.) at reduced symbol durations (such as, 16.67 microseconds). A TTI in eCC may consist of one or multiple symbol periods. In some implementations, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some implementations, NR shared spectrum may increase spectrum utilization and spectral efficiency, specifically through dynamic vertical (such as, across the frequency domain) and horizontal (such as, across the time domain) sharing of resources.

Wireless communications system 100 improve capability parameter signaling among different band combinations according to an absence or presence of certain capability parameters within a capability message. According to an implementation, when a power amplifier capability parameter (such as, dualpA-Architecture) is present within a capability message (such as, bit signaled, enabled), the UE 115 and the base station 105 may treat this as if a phase discontinuity capability parameter (such as, pa-PhaseDiscontinuityImpacts) is absent from the capability message.

Alternatively, according to another implementation, when a power amplifier capability parameter (such as, dualpA-Architecture) is absent within a capability message (such as, bit signaled, enabled), the UE 115 and the base station 105 may handle this as if a phase discontinuity capability parameter (such as, pa-PhaseDiscontinuityImpacts) is present within a capability message. Thus, for band combinations that include intra-band carrier aggregation with a single band, the UE 115 may include a power amplifier capability parameter (such as, dualpA-Architecture) or a phase discontinuity capability parameter (such as, pa-PhaseDiscontinuityImpacts). In some implementations, the UE 115 may be expected to include one and only of the capability parameters. That is, the UE 115 may be expected (such as, configured) to include one and only of the power amplifier capability parameter or the phase discontinuity capability parameter in the capability message. For all other band combinations, the UE 115 may refrain from including a power amplifier capability parameter (such as, dualpA-Architecture) in a capability message (such as, capability message), and may include a phase discontinuity capability parameter (such as, pa-PhaseDiscontinuityImpacts) in the capability message as needed. In some implementations, absence of both fields in a capability message, for example, a field associated with a power amplifier capability parameter and another field associated with a phase discontinuity capability parameter may be treated by the UE 115 (and the base station 105) as an error case.

Figure 2:
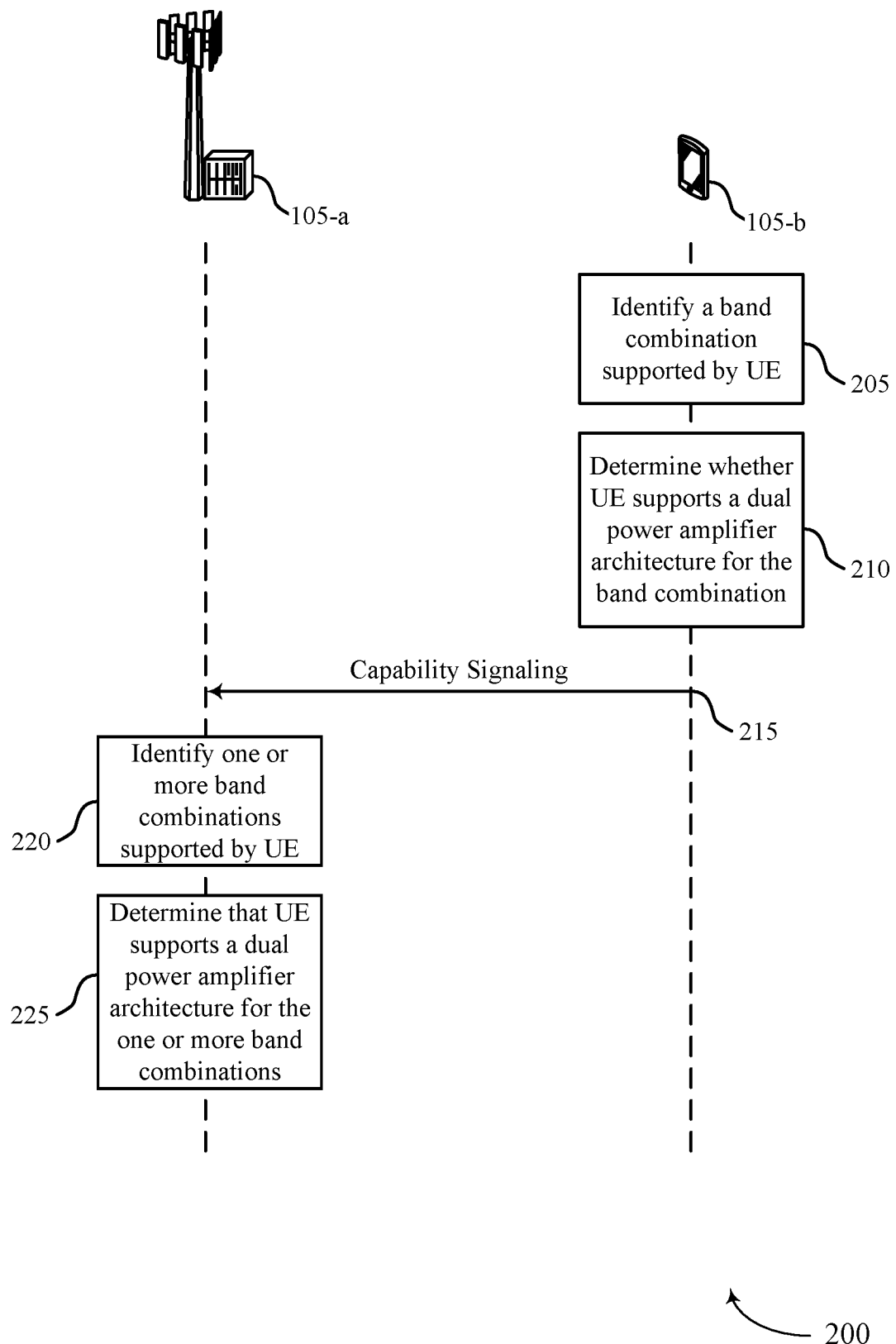
FIG. 2 illustrates an example of a process flow that supports capability signaling and handling phase discontinuity.

FIG. 2 illustrates an example of a process flow 200 that supports capability signaling and handling phase discontinuity. In some implementations, process flow 200 may implement aspects of wireless communication system 100. For example, process flow 200 may include base station 105-a and UE 115-a, which may be examples of corresponding devices described with reference to FIG. 1. In some implementations, process flow 200 may provide improvements to managing phase discontinuity and capability signaling for a single power amplifier vs. a dual power amplifier.

In the following description of process flow 200, the operations between the base station 105-a and the UE 115-a may be transmitted in a different order than the example order shown, or the operations performed by the base station 105-a and the UE 115-a may be performed in different orders or at different times. Certain operations also may be omitted from process flow 200, or other operations may be added to process flow 200.

At 205, the UE 115-a may identify a band combination supported by the UE 115-a. In some implementations, the UE 115-a may identify a band in the band combination supported by the UE 115-a. At 210, the UE 115-a may determine whether the UE 115-a supports a dual power amplifier architecture for the band combination. In some other implementations, the UE 115-a may determine whether the UE 115-a supports the dual power amplifier architecture for the band in the band combination. In some examples, the band combination may include more than one band. In some implementations, the UE 115-a may identify that the band combination includes an intra-band carrier aggregation with a first band. Alternatively, in some other implementations, the UE 115-a may identify that the band combination includes an EN-DC with a first band and an intra-band carrier aggregation with a second band. Here, the UE 115-a may select a power amplifier capability parameter or a phase discontinuity capability parameter from a set of capability parameters to include in a capability message according to the identified band combination. In some implementations, the power amplifier capability parameter or the phase discontinuity capability parameter may be configured to indicate whether the UE 115-a supports the dual power amplifier architecture for the band combination. In further implementations, the band combination may include an EN-DC, NE-DC, NR-NR DC, NR-CA, or any combination thereof.

At 215, UE 115-a may transmit capability signaling to the base station 105-a. In some implementations, the capability signaling may include a capability message (such as, a control message), which may include at least one of the power amplifier capability parameter or the phase discontinuity capability parameter from a set of capability parameters. In some other implementations, the UE 115-a may determine that a capability message may be unable to support including a power amplifier capability parameter for the band combination. As a result, the UE 115-a may generate a phase discontinuity capability parameter to indicate that the UE 115-a supports the dual power amplifier architecture for the band combination. As described herein, the power amplifier capability parameter may be a dualpA-Architecture parameter, while the phase discontinuity capability parameter may be a pa-PhaseDiscontinuityImpacts parameter. In some cases, the capability signaling may be unable to indicate at least one of the power amplifier capability parameter or the phase discontinuity capability parameter for band combinations with multiple bands. For example, if the UE 115-a operates according to three uplink carriers, where a first uplink carrier and a second uplink carrier in a first band, and a third uplink carrier in a second uplink band. The UE 115-a may use either a common or a separate power amplifier for the first band, but may be unable to indicate to the base station 105-a which case it is using the capability signaling.

At 220, the base station 105-a may identify one or more band combinations supported by the UE 115-a. In some other implementations, the base station 105-a may identify one or more bands in the one or more band combinations supported by the UE 115-a. At 225, the base station 105-a may determine that the UE 115-a supports a dual power amplifier architecture for the one or more band combinations or one or more bands in the one or more band combinations. In some implementations, the base station 105-a may identify that a first band combination of the one or more band combinations includes an intra-band carrier aggregation with a first band, and may determine whether the capability signaling (such as, capability message) includes a power amplifier capability parameter or a phase discontinuity capability parameter for the first band combination. Here, the base station 105-a may determine that the UE 115-a supports the dual power amplifier architecture for the first band combination based at least in part on determining whether the message includes the power amplifier capability parameter or the phase discontinuity capability parameter. The power amplifier capability parameter or the phase discontinuity capability parameter may be configured to indicate whether the UE 115-a supports the dual power amplifier architecture for the first band combination.

Alternatively, the base station 105-a may identify that a first band combination of the one or more band combinations includes an intra-band EN-DC with a first band and an intra-band carrier aggregation with a second band, and determine whether the capability signaling (such as, a capability message) includes a phase discontinuity capability parameter. Here, the base station 105-a may determine that the UE 115-a supports the dual power amplifier architecture for the first band combination based at least in part on determining whether the message includes the phase discontinuity capability parameter. In some other implementations, a bit-indication may be used by the UE 115-*a* to signal a capability parameter. For example, in some implementations, presence or absence of a capability parameter in a capability message may not be the indication, but a field value (such as, a set bit value) of a field of the capability parameter in the capability message and may indicate the UE capability. In some implementations, the base station 105-*a* may determine that the capability signaling (such as, a capability message) may be unsupportive of including a power amplifier capability parameter for a first band combination of the set of band combinations, and may determine whether the capability signaling (such as, a capability message) includes a phase discontinuity capability parameter. As a result, the base station 105-*a* may determine that the UE 115-*a* supports the dual power amplifier architecture for the first band combination based at least in part on determining whether the message includes the phase discontinuity capability parameter.

Accordingly, the operations performed by the base station 105-*a* and the UE 115-*a* as part of, but not limited to, process flow 200 may provide improvements in managing phase discontinuity and capability signaling (such as, single power amplifier vs. dual power amplifier). Additionally, or alternatively, the operations performed by the base station 105-*a* and the UE 115-*a* as part of, but not limited to, the process flow 200 may provide benefits and enhancements to the operation of UE 115-*a*. For example, by improving capability signaling, the operational characteristics, such as power consumption, and the like related to handling phase discontinuity for different band combinations may be reduced.

Figure 3:
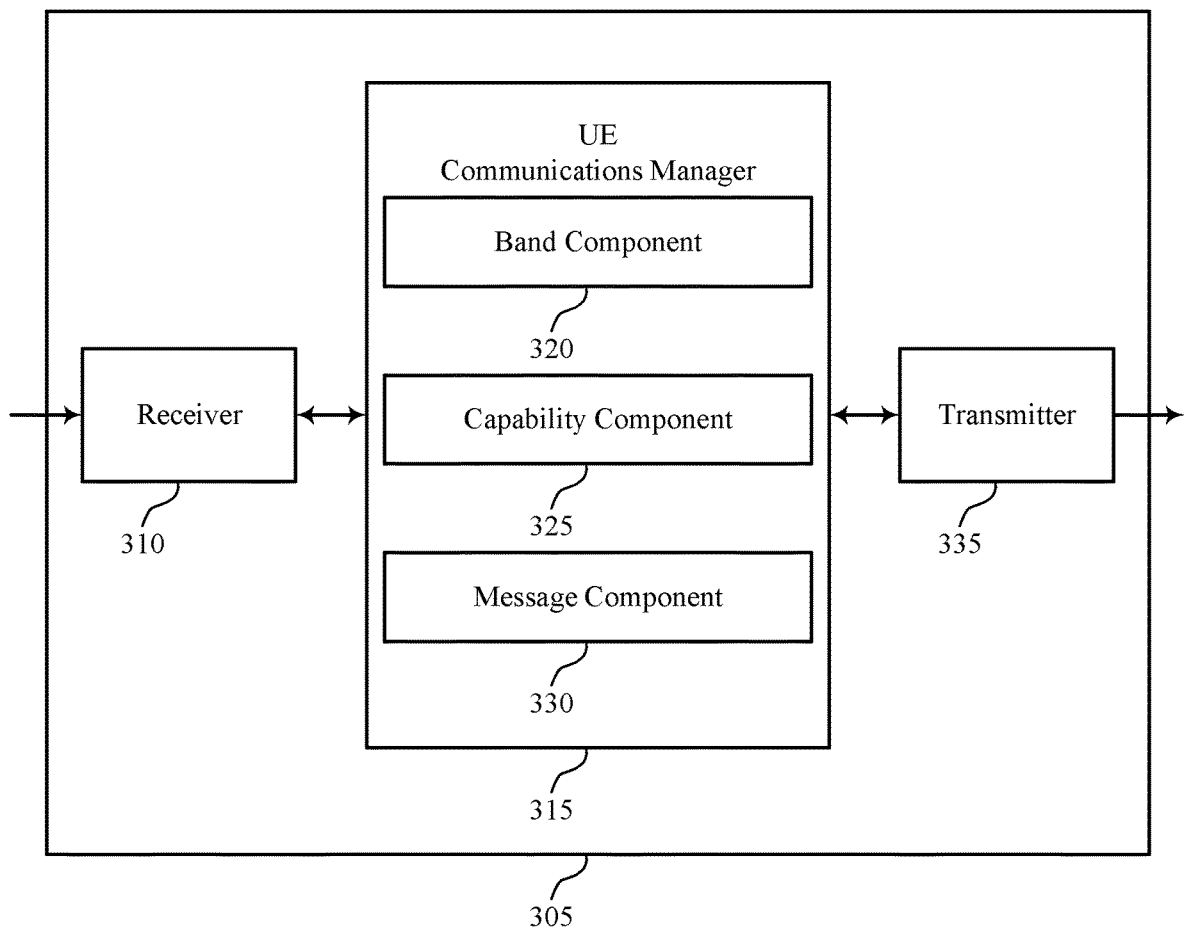
FIG. 3 shows a block diagram of a device that supports capability signaling and handling phase discontinuity.

FIG. 3 shows a block diagram 300 of a device 305 that supports capability signaling and handling phase discontinuity. The device 305 may be an example of aspects of a UE 115 as described herein. The device 305 may include a receiver 310, a UE communications manager 315, and a transmitter 335. The device 305 also may include a processor. Each of these components may be in communication with one another (such as, via one or more buses).

The receiver 310 may receive information such as packets, user data, or control information associated with various information channels (such as, control channels, data channels, and information related to capability signaling and handling phase discontinuity, etc.). Information may be passed on to other components of the device 305. The receiver 310 may be an example of aspects of the transceiver 420 described with reference to FIG. 4. The receiver 310 may utilize a single antenna or a set of antennas.

The UE communications manager 315, or its sub-components, may be implemented in hardware, code (such as, software or firmware) executed by a processor, or any combination thereof. If implemented in code executed by a processor, the functions of the UE communications manager 315, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 315, or its sub-components, may be physically located at various positions, including being distributed such that portions of functions are implemented at different physical locations by one or more physical components. In some implementations, the UE communications manager 315, or its sub-components, may be a separate and distinct component. In some implementations, the UE communications manager 315, or its sub-components, may be combined with one or more other hardware components, including but not limited to an input/output (I/O) component, a transceiver, a network server, another computing device, one or more other components described in the present disclosure, or a combination thereof.

The UE communications manager 315 may include a band component 320, a capability component 325, and a message component 330. The UE communications manager 315 may be an example of aspects of the UE communications manager 410 described herein. The band component 320 may identify one or more of a band combination or a band in the band combination supported by a UE. In some implementations, band component 320 may identify that the band combination includes an intra-band carrier aggregation with a first band, where identifying the band combination is based on identifying that the band combination includes the intra-band carrier aggregation with the first band. In some implementations, band component 320 may identify that the band combination includes an intra-band EN-DC with a first band and an intra-band carrier aggregation with a second band, where identifying the band combination is based on identifying that the band combination includes the EN-DC with the first band and the intra-band carrier aggregation with the second band. In some implementations, the band combination includes an EN-DC, NE-DC, NR-NR DC, NR-CA, or any combination thereof.

The capability component 325 may determine whether the UE supports a dual power amplifier architecture for one or more of the band combination or the band in the band combination. In some implementations, the capability component 325 may select a power amplifier capability parameter or a phase discontinuity capability parameter to include in the message, where transmitting the message is based on selecting the power amplifier capability parameter or the phase discontinuity capability parameter. In some implementations, the capability component 325 may select a phase discontinuity capability parameter to include in the message, where transmitting the message is based on selecting the phase discontinuity capability parameter. In some implementations, the capability component 325 may generate a phase discontinuity capability parameter to indicate that the UE supports the dual power amplifier architecture for the band combination, where the message includes the phase discontinuity capability parameter. In some implementations, the capability component 325 may identify whether the UE supports a phase discontinuity for the band combination, where transmitting the message is based on identifying whether the UE supports the phase discontinuity. In some implementations, the power amplifier capability parameter or the phase discontinuity capability parameter is configured to indicate whether the UE supports the dual power amplifier architecture for the band combination. In some other implementations, the power amplifier capability parameter may be inferred based at least in part on the phase discontinuity capability parameter, or the phase discontinuity capability parameter may be inferred based at least in part on the power amplifier capability parameter, or both. In some implementations, the power amplifier capability parameter includes a dualpA-Architecture parameter. In some implementations, the phase discontinuity capability parameter includes a pa-PhaseDiscontinuityImpacts parameter.

The message component 330 may transmit, to a base station, a message that includes an indication of whether the UE supports the dual power amplifier architecture for one or more of the band combination or the band in the band combination. In some implementations, the message component 330 may determine that the message does not support including a power amplifier capability parameter for the band combination. In some implementations, the message includes only one of the power amplifier capability parameter or the phase discontinuity capability parameter. In some implementations, the message includes a capability message configured to indicate capabilities of the UE to the base station.

The transmitter 335 may transmit signals generated by other components of the device 305. In some implementations, the transmitter 335 may be collocated with a receiver 310 in a transceiver module. For example, the transmitter 335 may be an example of aspects of the transceiver 420 described with reference to FIG. 4. The transmitter 335 may utilize a single antenna or a set of antennas.

Figure 4:
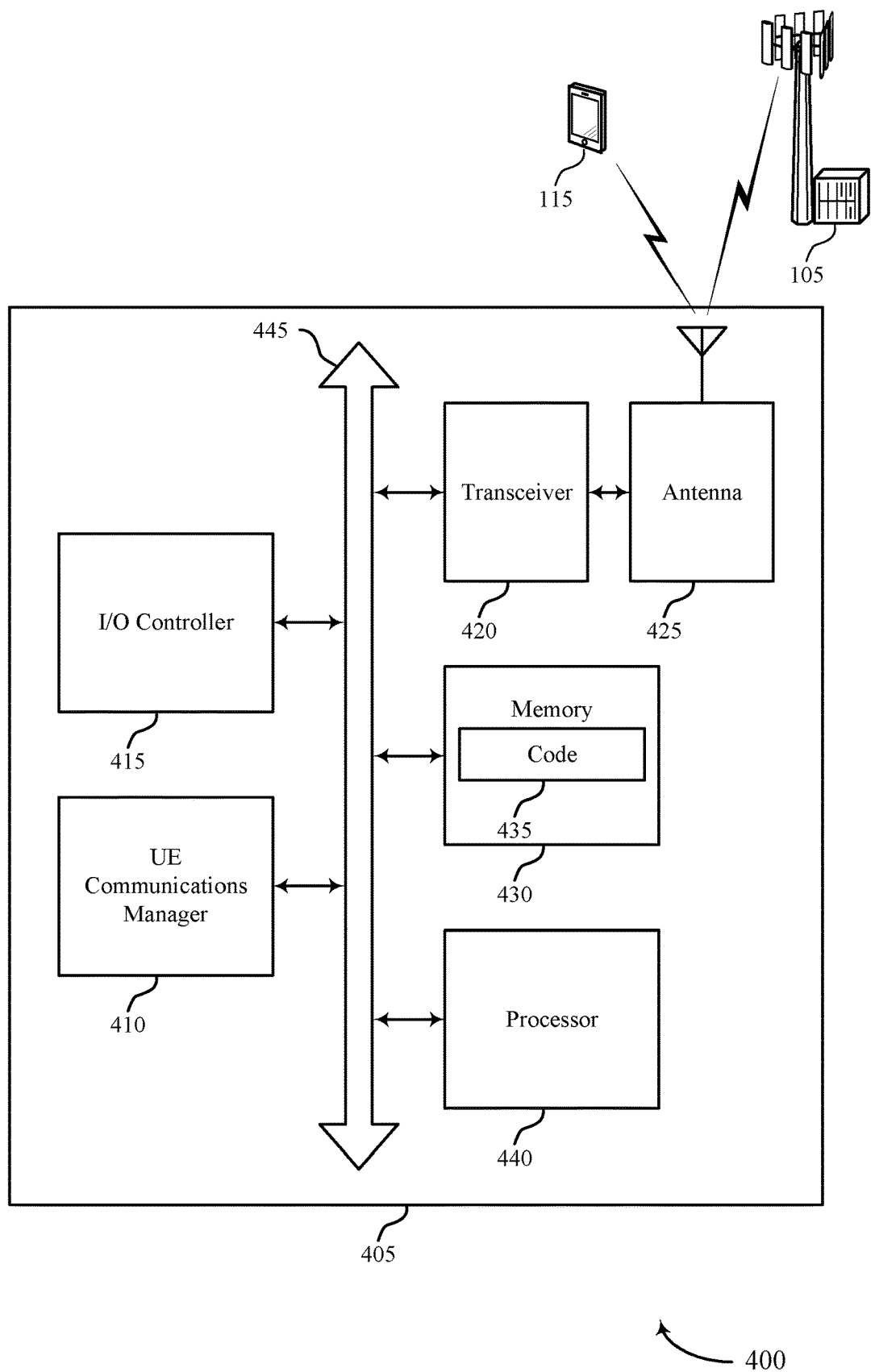
FIG. 4 shows a diagram of a system including a device that supports capability signaling and handling phase discontinuity.

FIG. 4 shows a diagram of a system 400 including a device 405 that supports capability signaling and handling phase discontinuity. The device 405 may be an example of or include the components of device 305, or a UE 115 as described herein. The device 405 may include components for bi-directional voice and data communications including components for transmitting and receiving communications, including a UE communications manager 410, an I/O controller 415, a transceiver 420, an antenna 425, memory 430, and a processor 440. These components may be in electronic communication via one or more buses (such as, bus 445).

The UE communications manager 410 may identify one or more of a band combination or a band in the band combination supported by a UE, determine whether the UE supports a dual power amplifier architecture for one or more of the band combination or the band in the band combination, and transmit, to a base station, a message that includes an indication of whether the UE supports the dual power amplifier architecture for one or more of the band combination or the band in the band combination.

The I/O controller 415 may manage input and output signals for the device 405. The I/O controller 415 also may manage peripherals not integrated into the device 405. In some implementations, the I/O controller 415 may represent a physical connection or port to an external peripheral. In some implementations, the I/O controller 415 may utilize an operating system such as iOS®, ANDROID®, MS-DOS®, MS-WINDOWS®, OS/2®, UNIX®, LINUX®, or another known operating system. In other cases, the I/O controller 415 may represent or interact with a modem, a keyboard, a mouse, a touchscreen, or a similar device. In some implementations, the I/O controller 415 may be implemented as part of a processor. In some implementations, a user may interact with the device 405 via the I/O controller 415 or via hardware components controlled by the I/O controller 415.

The transceiver 420 may communicate bi-directionally, via one or more antennas, wired, or wireless links as described above. For example, the transceiver 420 may represent a wireless transceiver and may communicate bi-directionally with another wireless transceiver. The transceiver 420 also may include a modem to modulate the packets and provide the modulated packets to the antennas for transmission, and to demodulate packets received from the antennas. In some implementations, the device 405 may include a single antenna 425. However, in some implementations the device 405 may have more than one antenna 425, which may be capable of concurrently transmitting or receiving multiple wireless transmissions.

The memory 430 may include random-access memory (RAM) and read-only memory (ROM). The memory 430 may store computer-readable, computer-executable code 435 including instructions that, when executed, cause the processor to perform various functions described herein. In some implementations, the memory 430 may contain, among other things, a basic input/basic output system (BIOS) which may control basic hardware or software operation such as the interaction with peripheral components or devices.

The code 435 may include instructions to implement aspects of the present disclosure, including instructions to support wireless communications. The code 435 may be stored in a non-transitory computer-readable medium such as system memory or other type of memory. In some implementations, the code 435 may not be directly executable by the processor 440 but may cause a computer (such as, when compiled and executed) to perform functions described herein.

The processor 440 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 440 may be configured to operate a memory array using a memory controller. In other cases, a memory controller may be integrated into the processor 440. The processor 440 may be configured to execute computer-readable instructions stored in a memory (such as, the memory 430) to cause the device 405 to perform various functions (such as, functions or tasks supporting capability signaling and handling phase discontinuity).

Figure 5:
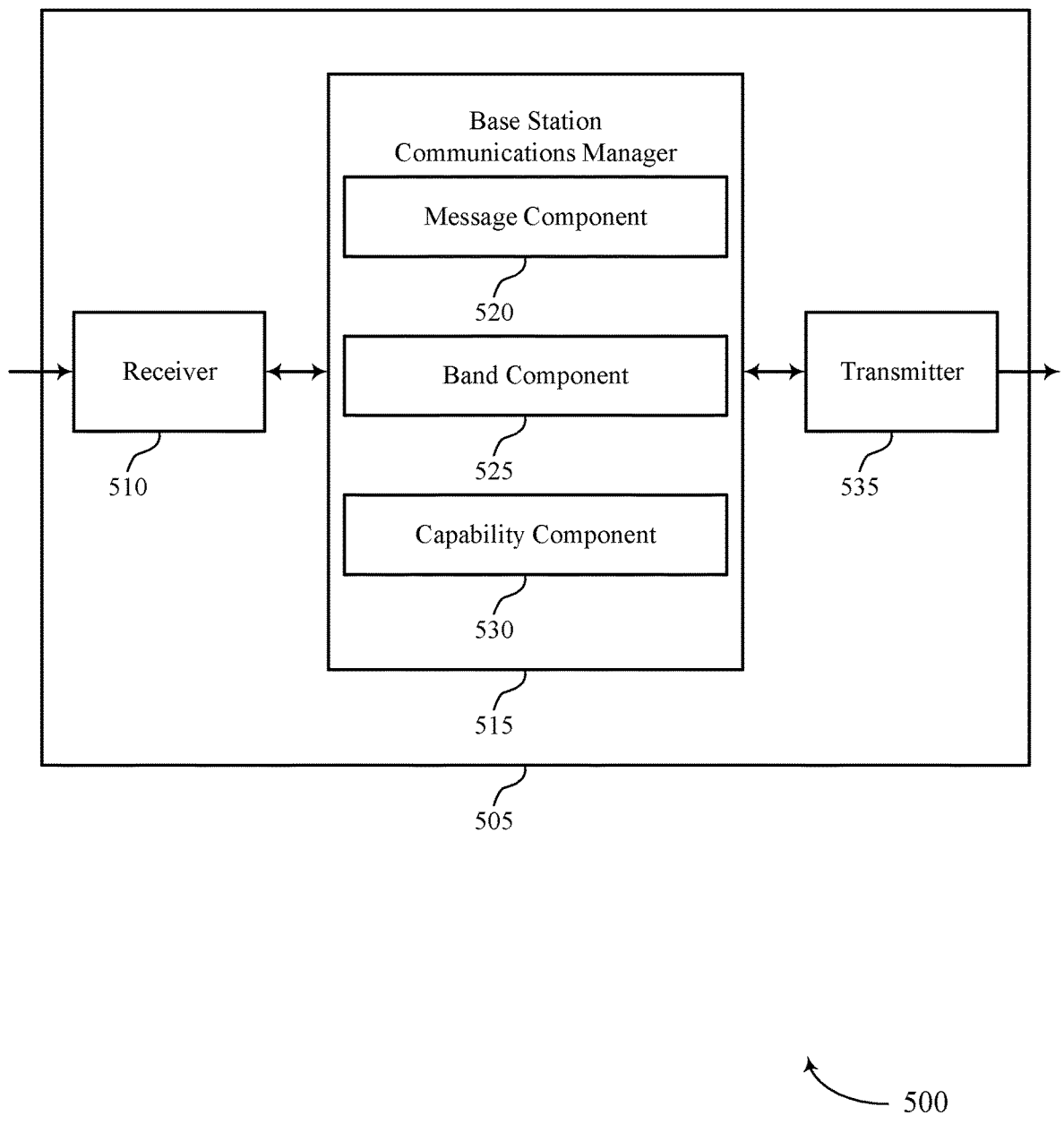
FIG. 5 shows a block diagram of a device that supports capability signaling and handling phase discontinuity.

FIG. 5 shows a block diagram 500 of a device 505 that supports capability signaling and handling phase discontinuity. The device 505 may be an example of aspects of a base station 105 as described herein. The device 505 may include a receiver 510, a base station communications manager 515, and a transmitter 535. The device 505 also may include a processor. Each of these components may be in communication with one another (such as, via one or more buses).

The receiver 510 may receive information such as packets, user data, or control information associated with various information channels (such as, control channels, data channels, and information related to capability signaling and handling phase discontinuity, etc.). Information may be passed on to other components of the device 505. The receiver 510 may be an example of aspects of the transceiver 620 described with reference to FIG. 6. The receiver 510 may utilize a single antenna or a set of antennas.

The base station communications manager 515, or its sub-components, may be implemented in hardware, code (such as, software or firmware) executed by a processor, or any combination thereof. If implemented in code executed by a processor, the functions of the base station communications manager 515, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 515, or its sub-components, may be physically located at various positions, including being distributed such that portions of functions are implemented at different physical locations by one or more physical components. In some implementations, the base station communications manager 515, or its subcomponents, may be a separate and distinct component. In some implementations, the base station communications manager 515, or its sub-components, may be combined with one or more other hardware components, including but not limited to an input/output (I/O) component, a transceiver, a network server, another computing device, one or more other components described in the present disclosure, or a combination thereof.

The base station communications manager 515 may include a message component 520, a band component 525, and a capability component 530. The base station communications manager 515 may be an example of aspects of the base station communications manager 610 described herein.

The message component 520 may receive, from a UE, a message that indicates one or more capabilities of the UE. In some implementations, the message component 520 may determine whether the message includes a power amplifier capability parameter or a phase discontinuity capability parameter for the first band combination, where determining that the UE supports the dual power amplifier architecture for the first band combination is based on determining whether the message includes the power amplifier capability parameter or the phase discontinuity capability parameter. In some implementations, the message component 520 may determine whether the message includes a phase discontinuity capability parameter, where determining that the UE supports the dual power amplifier architecture for the first band combination is based on determining whether the message includes the phase discontinuity capability parameter. In some implementations, the message component 520 may determine that the message does not support including a power amplifier capability parameter for a first band combination of the one or more band combinations.

The band component 525 may identify one or more band combinations or one or more bands in the one or more band combinations supported by the UE based on receiving the message. In some implementations, identifying that a first band combination of the one or more band combinations includes an intra-band carrier aggregation with a first band. In some implementations, identifying that a first band combination of the one or more band combinations includes an intra-band EN-DC with a first band and an intra-band carrier aggregation with a second band. In some implementations, the one or more band combinations include an EN-DC, NE-DC, NR-NR DC, NR-CA, or any combination thereof.

The capability component 530 may determine that the UE supports a dual power amplifier architecture for each of the one or more band combinations or the one or more bands in the one or more band combinations. In some implementations, the capability component 530 may determine whether the message includes a phase discontinuity capability parameter, where determining that the UE supports the dual power amplifier architecture for the first band combination is based on determining whether the message includes the phase discontinuity capability parameter. In some implementations, the capability component 530 may identify whether the UE supports a phase discontinuity for a first band combination of the one or more band combinations based on receiving the message. In some implementations, the power amplifier capability parameter or the phase discontinuity capability parameter is configured to indicate whether the UE supports the dual power amplifier architecture for the first band combination. In some other implementations, the power amplifier capability parameter may be inferred based at least in part on the phase discontinuity capability parameter, or the phase discontinuity capability parameter may be inferred based at least in part on the power amplifier capability parameter, or both. In some implementations, the power amplifier capability parameter or the phase discontinuity capability parameter is configured to indicate whether the UE supports a single power amplifier architecture or the dual power amplifier architecture for the first band combination. In some implementations, the power amplifier capability parameter includes a dualpA-Architecture parameter. In some implementations, the phase discontinuity capability parameter includes a pa-PhaseDiscontinuityImpacts parameter. In some implementations, the phase discontinuity capability parameter associated with the first band combination is configured to indicate whether the UE supports the dual power amplifier architecture for the first band combination.

The transmitter 535 may transmit signals generated by other components of the device 505. In some implementations, the transmitter 535 may be collocated with a receiver 510 in a transceiver module. For example, the transmitter 535 may be an example of aspects of the transceiver 620 described with reference to FIG. 6. The transmitter 535 may utilize a single antenna or a set of antennas.

Figure 6:
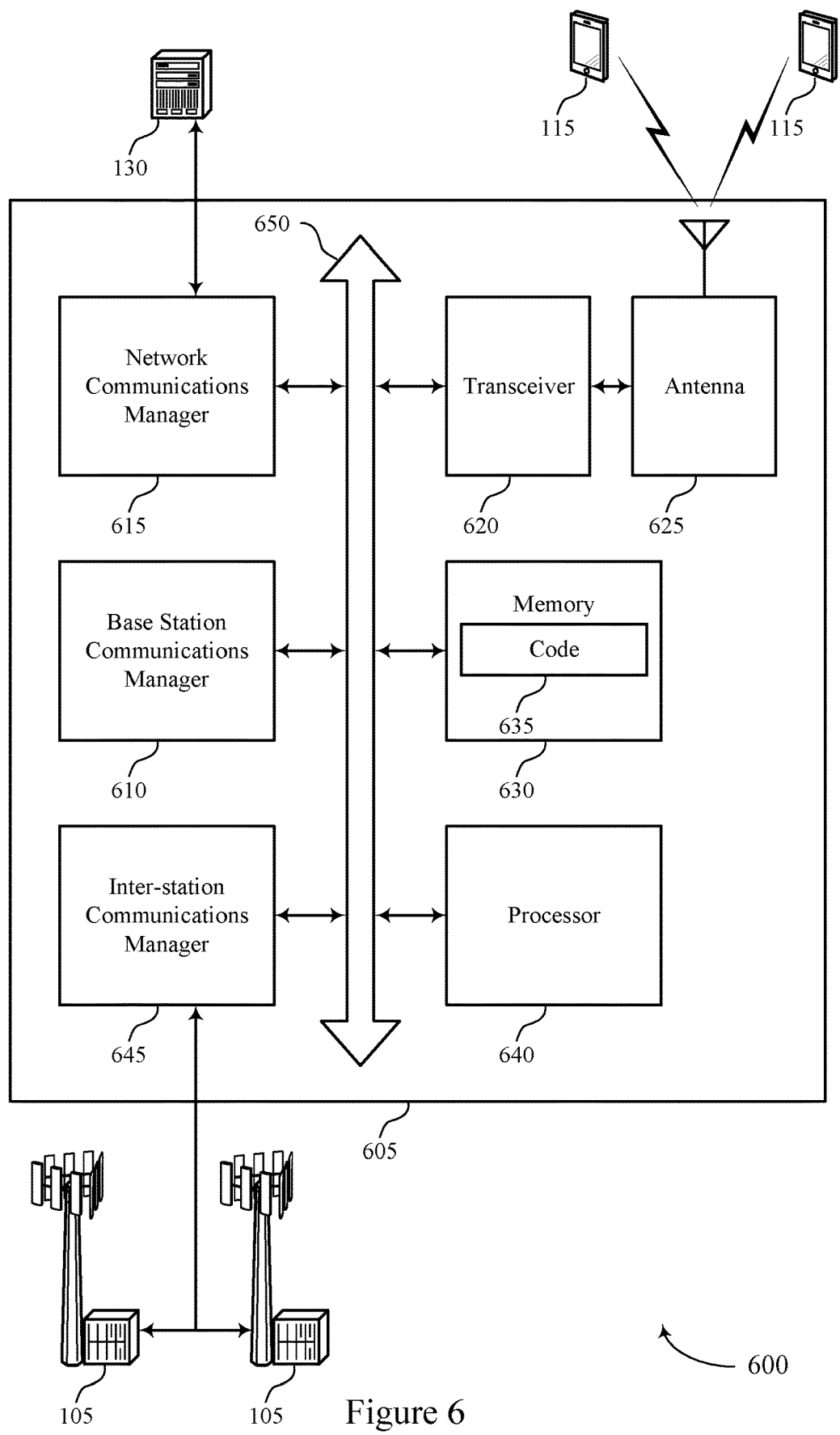
FIG. 6 shows a diagram of a system including a device that supports capability signaling and handling phase discontinuity.

FIG. 6 shows a diagram of a system 600 including a device 605 that supports capability signaling and handling phase discontinuity. The device 605 may be an example of or include the components of device 505, or a base station 105 as described herein. The device 605 may include components for bi-directional voice and data communications including components for transmitting and receiving communications, including a base station communications manager 610, a network communications manager 615, a transceiver 620, an antenna 625, memory 630, a processor 640, and an inter-station communications manager 645. These components may be in electronic communication via one or more buses (such as, bus 650).

The base station communications manager 610 may receive, from a UE, a message that indicates one or more capabilities of the UE, identify one or more band combinations or one or more bands in the one or more band combinations supported by the UE based on receiving the message, and determine that the UE supports a dual power amplifier architecture for each of the one or more band combinations or the one or more bands in the one or more band combinations.

The network communications manager 615 may manage communications with the core network (such as, via one or more wired backhaul links). For example, the network communications manager 615 may manage the transfer of data communications for client devices, such as one or more UEs 115.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 also may include a modem to modulate the packets and provide the modulated packets to the antennas for transmission, and to demodulate packets received from the antennas. In some implementations, the device 605 may include a single antenna 625. However, in some implementations the device 605 may have more than one antenna 625, which may be capable of concurrently transmitting or receiving multiple wireless transmissions.

The memory 630 may include RAM, ROM, or a combination thereof. The memory 630 may store computer-readable code 635 including instructions that, when executed by a processor (such as, the processor 640) cause the device to perform various functions described herein. In some implementations, the memory 630 may contain, among other things, a BIOS which may control basic hardware or software operation such as the interaction with peripheral components or devices.

The code 635 may include instructions to implement aspects of the present disclosure, including instructions to support wireless communications. The code 635 may be stored in a non-transitory computer-readable medium such as system memory or other type of memory. In some implementations, the code 635 may not be directly executable by the processor 640 but may cause a computer (such as, when compiled and executed) to perform functions described herein.

The processor 640 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 640 may be configured to operate a memory array using a memory controller. In some implementations, a memory controller may be integrated into processor 640. The processor 640 may be configured to execute computer-readable instructions stored in a memory (such as, the memory 630) to cause the device 605 to perform various functions (such as, functions or tasks supporting capability signaling and handling phase discontinuity).

The inter-station communications manager 645 may manage communications with other base station 105, and may include a controller or scheduler for controlling communications with UEs 115 in cooperation with other base stations 105. For example, the inter-station communications manager 645 may coordinate scheduling for transmissions to UEs 115 for various interference mitigation techniques such as beamforming or joint transmission. In some implementations, the inter-station communications manager 645 may provide an X2 interface within an LTE/LTE-A wireless communication network technology to provide communication between base stations 105.

Figure 7:
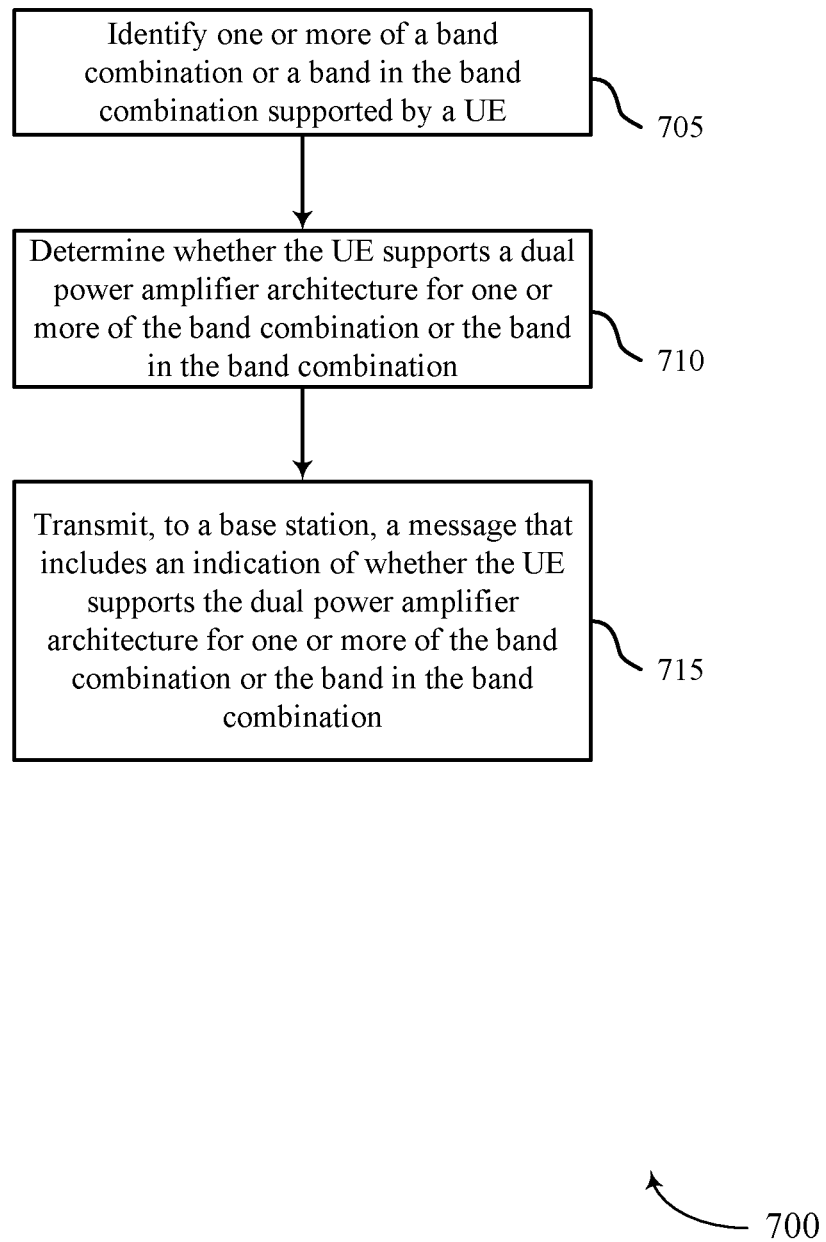
FIGS. 7 and 8 show flowcharts illustrating methods that support capability signaling and handling phase discontinuity.

FIG. 7 shows a flowchart illustrating a method 700 that supports capability signaling and handling phase discontinuity. The operations of method 700 may be implemented by a UE 115 or its components as described herein. For example, the operations of method 700 may be performed by a UE communications manager as described with reference to FIGS. 3 and 4. In some implementations, a UE may execute a set of instructions to control the functional elements of the UE to perform the functions described below. Additionally, or alternatively, a UE may perform aspects of the functions described below using special-purpose hardware.

At 705, the UE may identify one or more of a band combination or a band in the band combination supported by a UE. The operations of 705 may be performed according to the methods described herein. In some implementations, aspects of the operations of 705 may be performed by a band component as described with reference to FIGS. 3 and 4.

At 710, the UE may determine whether the UE supports a dual power amplifier architecture for one or more of the band combination or the band in the band combination. The operations of 710 may be performed according to the methods described herein. In some implementations, aspects of the operations of 710 may be performed by a capability component as described with reference to FIGS. 3 and 4.

At 715, the UE may transmit, to a base station, a message that includes an indication of whether the UE supports the dual power amplifier architecture for one or more of the band combination or the band in the band combination. The operations of 715 may be performed according to the methods described herein. In some implementations, aspects of the operations of 715 may be performed by a message component as described with reference to FIGS. 3 and 4.

Figure 8:
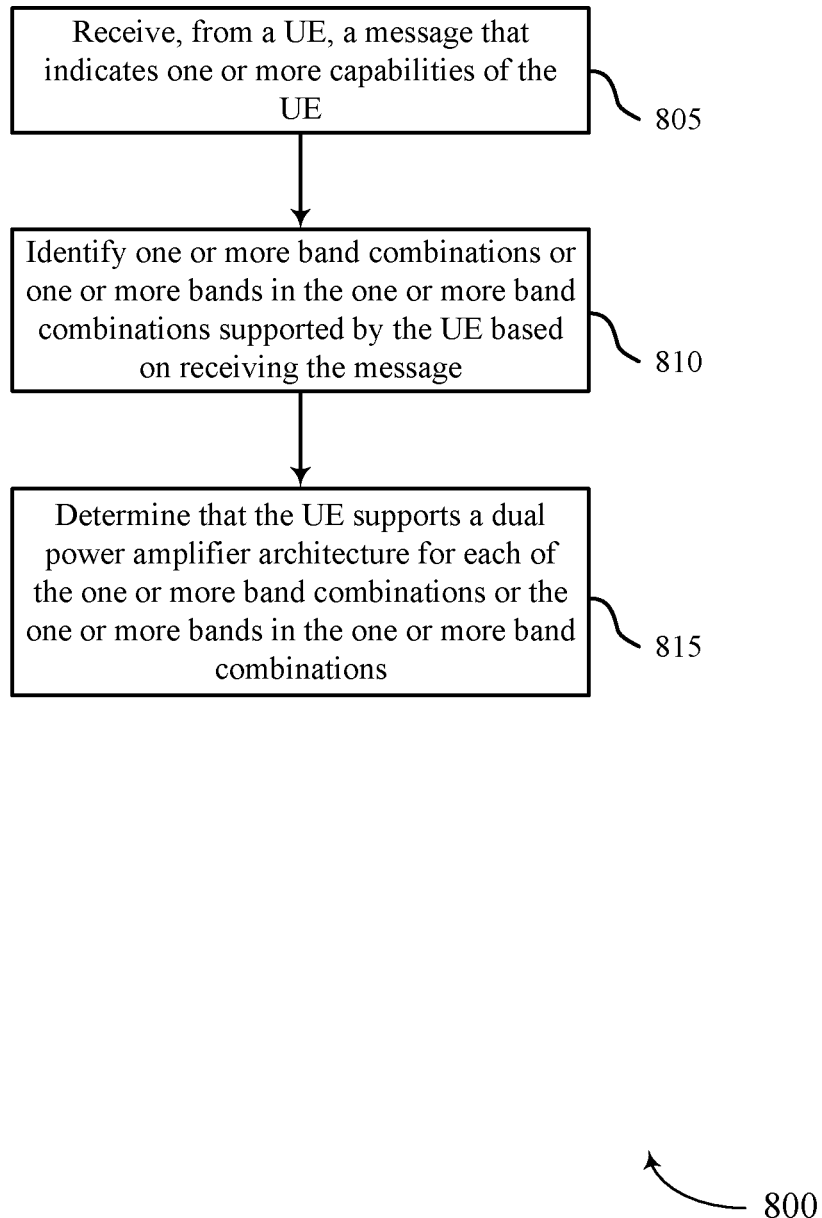

FIG. 8 shows a flowchart illustrating a method 800 that supports capability signaling and handling phase discontinuity. The operations of method 800 may be implemented by a base station 105 or its components as described herein. For example, the operations of method 800 may be performed by a base station communications manager as described with reference to FIGS. 5 and 6. In some implementations, a base station may execute a set of instructions to control the functional elements of the base station to perform the functions described below. Additionally, or alternatively, a base station may perform aspects of the functions described below using special-purpose hardware.

At 805, the base station may receive, from a UE, a message that indicates one or more capabilities of the UE. The operations of 805 may be performed according to the methods described herein. In some implementations, aspects of the operations of 805 may be performed by a message component as described with reference to FIGS. 5 and 6.

At 810, the base station may identify one or more band combinations or one or more bands in the one or more band combinations supported by the UE based on receiving the message. The operations of 810 may be performed according to the methods described herein. In some implementations, aspects of the operations of 810 may be performed by a band component as described with reference to FIGS. 5 and 6.

At 815, the base station may determine that the UE supports a dual power amplifier architecture for each of the one or more band combinations or the one or more bands in the one or more band combinations. The operations of 815 may be performed according to the methods described herein. In some implementations, aspects of the operations of 815 may be performed by a capability component as described with reference to FIGS. 5 and 6.

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (such as, several kilometers in radius) and may allow unrestricted access by UEs with service subscriptions with the network provider. A small cell may be associated with a lower-powered base station, as compared with a macro cell, and a small cell may operate in the same or different (such as, licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell also may cover a small geographic area (such as, a home) and may provide restricted access by UEs having an association with the femto cell (such as, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (such as, two, three, four, and the like) cells, and also may support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor also may be implemented as a combination of computing devices (such as, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions also may be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (such as, a list of items prefaced by a phrase such as "at least one of" or "one or more of") indicates an inclusive list such that, for example, a list of at least one of A, B, or C means A or B or C or AB or AC or BC or ABC (such as, A and B and C).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person having ordinary skill in the art to make or use the disclosure. Various modifications to the disclosure will be readily apparent to those having ordinary skill in the art, and the generic principles defined herein may be applied to other variations without departing from the scope of the disclosure. Thus, the disclosure is not limited to the examples and designs described herein, but is to be accorded the broadest scope consistent with the principles and features disclosed herein.

What is claimed is:

1. A method for wireless communication, comprising:
transmitting, to a base station, a message that includes an indication of whether a user equipment (UE) supports a dual power amplifier architecture for one or more of a band combination or a band in the band combination associated with a dual power amplifier capability parameter and a phase discontinuity capability parameter, the indication comprising a selection of the dual power amplifier capability parameter and the phase discontinuity capability parameter.

2. The method of claim 1, further comprising:
identifying that the band combination comprises an intra-band carrier aggregation with a first band, wherein identifying the band combination is based at least in part on identifying that the band combination comprises the intra-band carrier aggregation with the first band.

3. The method of claim 1, wherein:
the power amplifier capability parameter or the phase discontinuity capability parameter is configured to indicate whether the UE supports the dual power amplifier architecture for the band combination, and
the power amplifier capability parameter is inferred based at least in part on the phase discontinuity capability parameter, or the phase discontinuity capability parameter is inferred based at least in part on the power amplifier capability parameter, or both.

4. The method of claim 1, wherein the message includes only one of the power amplifier capability parameter or the phase discontinuity capability parameter.

5. The method of claim 1, wherein:
the power amplifier capability parameter comprises a dualpA-Architecture parameter; and
the phase discontinuity capability parameter comprises a pa-PhaseDiscontinuityImpacts parameter.

6. The method of claim 1, further comprising:
identifying that the band combination comprises an intra-band E-UTRAN New Radio Dual Connectivity (EN-DC) with a first band and an intra-band carrier aggregation with a second band, wherein identifying the band combination is based at least in part on identifying that the band combination comprises the EN-DC with the first band and the intra-band carrier aggregation with the second band; and
selecting a phase discontinuity capability parameter to include in the message, wherein transmitting the message is based at least in part on selecting the phase discontinuity capability parameter.

7. The method of claim 1, further comprising:
determining that the message does not support including a power amplifier capability parameter for the band combination; and
generating a phase discontinuity capability parameter to indicate whether the UE supports the dual power amplifier architecture for the band combination, wherein the message includes the phase discontinuity capability parameter.

8. The method of claim 1, further comprising:
identifying whether the UE supports a phase discontinuity for the band combination, wherein transmitting the message is based at least in part on identifying whether the UE supports the phase discontinuity.

9. The method of claim 1, wherein the band combination comprises an EN-DC, NE-DC, NR-NR DC, NR-CA, or any combination thereof.

10. The method of claim 1, wherein the message comprises a capability message configured to indicate capabilities of the UE to the base station.

11. A method for wireless communication, comprising:
receiving, from a user equipment (UE), a message that includes an indication of whether the UE supports a dual power amplifier architecture for one or more of a band combination or a band in the band combination associated with a dual power amplifier capability parameter and a phase discontinuity capability parameter, the indication comprising a selection of the dual power amplifier capability parameter and the phase discontinuity capability parameter.

12. The method of claim 11, further comprising:
identifying that a first band combination of the one or more band combinations comprises an intra-band carrier aggregation with a first band; and
determining whether the message includes the power amplifier capability parameter or the phase discontinuity capability parameter for the first band combination, wherein determining that the UE supports the dual power amplifier architecture for the first band combination is based at least in part on determining whether the message includes the power amplifier capability parameter or the phase discontinuity capability parameter.

13. The method of claim 11, wherein:
the power amplifier capability parameter or the phase discontinuity capability parameter is configured to indicate whether the UE supports the dual power amplifier architecture for the first band combination, and
the power amplifier capability parameter may be inferred based at least in part on the phase discontinuity capability parameter, or the phase discontinuity capability parameter may be inferred based at least in part on the power amplifier capability parameter, or both.

14. The method of claim 11, the message includes only one of the power amplifier capability parameter or the phase discontinuity capability parameter.

15. The method of claim 11, wherein:
the power amplifier capability parameter comprises a dualpA-Architecture parameter; and
the phase discontinuity capability parameter comprises a pa-PhaseDiscontinuityImpacts parameter.

16. The method of claim 11, further comprising:
identifying that a first band combination of the one or more band combinations comprises an intra-band E-UTRAN New Radio—Dual Connectivity (EN-DC) with a first band and an intra-band carrier aggregation with a second band; and
determining whether the message includes a phase discontinuity capability parameter, wherein determining that the UE supports the dual power amplifier architecture for the first band combination is based at least in part on determining whether the message includes the phase discontinuity capability parameter.

17. The method of claim 16, wherein the phase discontinuity capability parameter associated with the first band combination is configured to indicate whether the UE supports the dual power amplifier architecture for the first band combination.

18. The method of claim 11, further comprising:
determining that the message does not support including a power amplifier capability parameter for a first band combination of the one or more band combinations; and
determining whether the message includes a phase discontinuity capability parameter, wherein determining that the UE supports the dual power amplifier architecture for the first band combination is based at least in part on determining whether the message includes the phase discontinuity capability parameter.

19. The method of claim 11, further comprising:
identifying whether the UE supports a phase discontinuity for a first band combination of the one or more band combinations based at least in part on receiving the message.

20. The method of claim 11, wherein the one or more band combinations comprise an EN-DC, NE-DC, NR-NR DC, NR-CA, or any combination thereof.

21. An apparatus for wireless communication, comprising:
a processor,
memory in electronic communication with the processor; and
instructions stored in the memory and executable by the processor to cause the apparatus to:
transmit, to a base station, a message that includes an indication of whether the UE supports the dual power amplifier architecture for one or more of the band combination or a band in the band combination associated with a dual power amplifier capability parameter and a phase discontinuity capability parameter, the indication comprising a combination of the dual power amplifier capability parameter and the phase discontinuity capability parameter.

22. The apparatus of claim 21, wherein the instructions are further executable by the processor to cause the apparatus to:
identify that the band combination comprises an intra-band carrier aggregation with a first band, wherein identifying the band combination is based at least in part on identifying that the band combination comprises the intra-band carrier aggregation with the first band.

23. The apparatus of claim 21, wherein:
the power amplifier capability parameter or the phase discontinuity capability parameter is configured to indicate whether the UE supports the dual power amplifier architecture for the band combination; and
the power amplifier capability parameter is inferred based at least in part on the phase discontinuity capability parameter, or the phase discontinuity capability parameter is inferred based at least in part on the power amplifier capability parameter, or both.

24. The apparatus of claim 21, wherein the message includes only one of the power amplifier capability parameter or the phase discontinuity capability parameter.

25. The apparatus of claim 21, wherein:
the power amplifier capability parameter comprises a dualpA-Architecture parameter; and
the phase discontinuity capability parameter comprises a pa-PhaseDiscontinuityImpacts parameter.

26. The apparatus of claim 21, wherein the instructions are further executable by the processor to cause the apparatus to:
identify that the band combination comprises an intra-band E-UTRAN New Radio—Dual Connectivity (EN-DC) with a first band and an intra-band carrier aggregation with a second band, wherein identifying the band combination is based at least in part on identifying that the band combination comprises the EN-DC with the first band and the intra-band carrier aggregation with the second band; and
select a phase discontinuity capability parameter to include in the message, wherein transmitting the message is based at least in part on selecting the phase discontinuity capability parameter.

27. The apparatus of claim 21, wherein the instructions are further executable by the processor to cause the apparatus to:
determine that the message does not support including a power amplifier capability parameter for the band combination; and
generate a phase discontinuity capability parameter to indicate whether the UE supports the dual power amplifier architecture for the band combination, wherein the message includes the phase discontinuity capability parameter.

28. The apparatus of claim 21, wherein the instructions are further executable by the processor to cause the apparatus to:
identify whether the UE supports a phase discontinuity for the band combination, wherein transmitting the message is based at least in part on identifying whether the UE supports the phase discontinuity.

29. An apparatus for wireless communication, comprising:
a processor,
memory in electronic communication with the processor; and
instructions stored in the memory and executable by the processor to cause the apparatus to:
receive, from a user equipment (UE), a message that includes an indication of whether the UE supports a dual power amplifier architecture for one or more of a band combination or a band in the band combination associated with a dual power amplifier capability parameter and a phase discontinuity capability parameter, the indication comprising a selection of the dual power amplifier capability parameter and the phase discontinuity capability parameter.

30. The apparatus of claim 29, wherein the instructions are further executable by the processor to cause the apparatus to:
identify that a first band combination of the one or more band combinations comprises an intra-band carrier aggregation with a first band; and
determine whether the message includes a power amplifier capability parameter or a phase discontinuity capability parameter for the first band combination, wherein the instructions to determine that the UE supports the dual power amplifier architecture for the first band combination is further executable by the processor based at least in part on determining whether the message includes the power amplifier capability parameter or the phase discontinuity capability parameter.

* * * * *